No. 677,461. Patented July 2, 1901.
L. J. MATHIAS.
NUT LOCK.
(Application filed Mar. 27, 1901.)

(No Model.)

WITNESSES
Chas. C. Defenbaugh.
Frank M. Breser.

INVENTOR
Louis J. Mathias.
By Carl J. Keller, atty.

THE NORRIS PETERS CO., PHOTO-LITHO., WASHINGTON, D. C.

UNITED STATES PATENT OFFICE.

LOUIS J. MATHIAS, OF TOLEDO, OHIO.

NUT-LOCK.

SPECIFICATION forming part of Letters Patent No. 677,461, dated July 2, 1901.

Application filed March 27, 1901. Serial No. 53,069. (No model.)

*To all whom it may concern:*

Be it known that I, LOUIS J. MATHIAS, of Toledo, county of Lucas, and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to a nut-lock, and has for one object to provide simple, inexpensive, and durable means for locking the nut of a bolt against rotation.

A further object of my invention is to provide a lock for the nut of a bolt which may be conveniently locked and thereafter unlocked without injury to the threads of the bolt or the nut.

In carrying out my invention I employ certain features of construction and the novel arrangement of the parts hereinafter fully described, and particularly pointed out in the claim.

Figure 1:
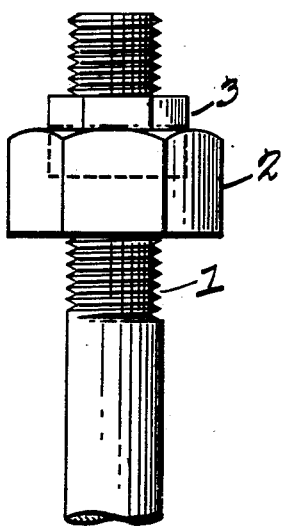
Figure 2:
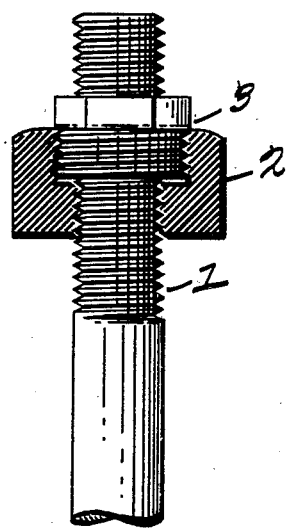
Figure 3:
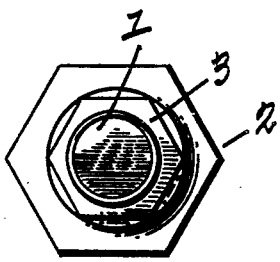

In the drawings, Figure 1 is an elevation showing my invention. Fig. 2 is an elevation, the main nut of the bolt being shown in section, the shank of the bolt and the lock-nut being in full lines. Fig. 3 is a plan view of the bolt, the main nut and the lock-nut being in position, the same embodying my invention.

Referring to the parts, 1 is the screw-threaded shank of an ordinary bolt, adapted to receive a main nut 2. In the upper face of the nut 2 is formed a circular recess eccentric to the shank of the bolt. The same is internally screw-threaded, the pitch of the thread being the same as that upon the shank of the bolt.

3 is an eccentric lock-nut internally screw-threaded to receive the screw-threaded shank of the bolt and externally screw-threaded to enter the eccentric recess in the main nut 1.

The lock-nut 3 is formed with suitable engaging surfaces extending above the main nut for the purpose of receiving a wrench, by which the same is turned in the operation of locking and unlocking.

The operation of my invention is as follows: The eccentric lock-nut 3 is screwed into the eccentric recess in the main nut 2. The same is, however, not screwed the full depth of the recess, a space being left between the lower face of the lock-nut and the bottom of the recess. The lock-nut in the eccentric recess is turned to bring the screw-threaded opening therethrough in alinement with the screw-threaded opening in the main nut, the two then being screwed as a single nut upon the shank of the bolt. When the nut has advanced upon the bolt to the position it is to occupy thereon, the lock-nut is independently turned by means of a wrench, and the same being slightly eccentric to the shank there will result a lateral impingement upon the main nut, insuring the same against further rotation.

It will be observed that the threads actually engaged in sustaining the strain upon the bolt are not less in number than those of an ordinary bolt of equal dimensions. The proportions of the main nut which I employ are therefore the same as those of an ordinary nut, it being unnecessary to increase the depth of the nut for the purpose of additional strength. After having been locked in position the main nut is unlocked by giving a backward rotation to the lock-nut.

It is obvious that the operation of locking and unlocking a nut by my improved means will in no manner cut or impair the threads of the bolt or the nut.

The improved operation, construction, and advantages of my invention will be apparent.

Having described my invention, what I claim, and desire to secure by Letters Patent, is—

In a nut-lock, the combination with the screw-threaded shank of a bolt, of a main nut, an internally-screw-threaded eccentric recess in the upper face of said main nut, and an externally-screw-threaded lock-nut, eccentric to the shank of the bolt, disposed in said recess, and suitable engaging surfaces upon said lock-nut to permit of rotating the same independent of the main nut, as set forth.

In testimony that I claim the foregoing as my own I affix my signature in presence of two witnesses.

LOUIS J. MATHIAS.

Witnesses:
CARL H. KELLER,
CHAS. C. DEFENBAUGH.